United States Patent
Konecny et al.

(10) Patent No.: US 10,438,455 B2
(45) Date of Patent: Oct. 8, 2019

(54) MODULAR CONSUMER FINANCIAL SERVICES AND TRANSACTION SYSTEMS

(71) Applicant: Diebold Nixdorf, Incorporated, North Canton, OH (US)

(72) Inventors: Robert Konecny, Brunswick, OH (US); Richard Harris, Warshash (GB)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 15/522,885

(22) PCT Filed: Nov. 2, 2015

(86) PCT No.: PCT/US2015/058592
§ 371 (c)(1),
(2) Date: Apr. 28, 2017

(87) PCT Pub. No.: WO2016/070173
PCT Pub. Date: May 6, 2016

(65) Prior Publication Data
US 2017/0337783 A1    Nov. 23, 2017

Related U.S. Application Data

(60) Provisional application No. 62/073,255, filed on Oct. 31, 2014, provisional application No. 62/233,009, (Continued)

(51) Int. Cl.
*G07F 19/00* (2006.01)
*E04H 1/12* (2006.01)
(Continued)

(52) U.S. Cl.
CPC ............. *G07F 19/202* (2013.01); *E04H 1/12* (2013.01); *G06Q 20/1085* (2013.01);
(Continued)

(58) Field of Classification Search
None
See application file for complete search history.

(56) References Cited

U.S. PATENT DOCUMENTS 4,121,523 A * 10/1978 Hastings ................... E05G 5/02
109/11
D273,422 S * 4/1984 Elliott ............................ 902/35
(Continued)

FOREIGN PATENT DOCUMENTS

DE     102008019233 A1    9/2009
EP        0959439 A1    11/1999
(Continued)

OTHER PUBLICATIONS

Machine Translation, dated Oct. 9, 2017, of Abstract for DE102008019233.
(Continued)

*Primary Examiner* — Christle I Marshall
(74) *Attorney, Agent, or Firm* — Black, McCuskey Souers & Arbaugh, LPA

(57) ABSTRACT

A modular system for financial services and transactions includes an enclosure with at least one wall defining an interior space. A spine is disposed within the interior space and houses at least one component. At least one sub-system is disposed in the interior space of the enclosure and connected to the at least one component housed in the spine. The at least one sub-system is operable to interact with a financial customer.

20 Claims, 17 Drawing Sheets

Related U.S. Application Data filed on Sep. 25, 2015, provisional application No. 62/239,589, filed on Oct. 9, 2015, provisional application No. 62/246,038, filed on Oct. 24, 2015.

(51) Int. Cl.
| | | |
|---|---|---|
| *G06Q 20/10* | (2012.01) | |
| *G06Q 20/32* | (2012.01) | |
| *E05G 7/00* | (2006.01) | |
| *H04W 4/80* | (2018.01) | |
| *G06F 3/0482* | (2013.01) | |
| *G06F 3/0486* | (2013.01) | |
| *G06F 3/0488* | (2013.01) | |
| *G06F 3/14* | (2006.01) | |

(52) U.S. Cl.
CPC ......... *G06Q 20/327* (2013.01); *G07F 19/203* (2013.01); *G07F 19/205* (2013.01); *G07F 19/211* (2013.01); *E05G 7/002* (2013.01); *G06F 3/0482* (2013.01); *G06F 3/0486* (2013.01); *G06F 3/04883* (2013.01); *G06F 3/1423* (2013.01); *G07F 19/206* (2013.01); *H04W 4/80* (2018.02)

(56) References Cited

U.S. PATENT DOCUMENTS

| | | | | |
|---|---|---|---|---|
| 4,580,040 A | * | 4/1986 | Granzow | G06Q 20/04 235/379 |
| D286,098 S | * | 10/1986 | Prinzhorn | D25/1 |
| D334,985 S | * | 4/1993 | D'Agostino | D25/1 |
| 5,282,341 A | | 2/1994 | Baloga et al. | |
| 5,526,615 A | * | 6/1996 | Kaizu | G07F 19/20 109/11 |
| 5,600,114 A | * | 2/1997 | Dunlap | G06Q 20/18 235/379 |
| 5,676,456 A | | 10/1997 | Sharp | |
| 6,223,983 B1 | * | 5/2001 | Kjonaas | G06Q 10/10 235/379 |
| D447,311 S | * | 8/2001 | Swaine | D14/307 |
| 7,191,152 B1 | | 3/2007 | Mukogawa | |
| 7,475,809 B2 | * | 1/2009 | Romary | G07F 19/00 235/379 |
| D621,524 S | * | 8/2010 | Olson | D14/307 |
| 2001/0045457 A1 | | 11/2001 | Terranova | |
| 2001/0054019 A1 | | 12/2001 | De Fabrega | |
| 2009/0165683 A1 | * | 7/2009 | Bakke | E05G 5/02 109/49.5 |
| 2012/0200150 A1 | * | 8/2012 | Urano | B60L 11/182 307/9.1 |
| 2015/0179025 A1 | * | 6/2015 | Cowell | E05G 7/00 109/10 |
| 2015/0379434 A1 | * | 12/2015 | Argue | G06Q 10/02 705/5 |

FOREIGN PATENT DOCUMENTS

| | | |
|---|---|---|
| FR | 2808914 A1 | 11/2001 |
| GB | 2025106 A | 1/1980 |
| JP | 2000154661 A | 6/2006 |
| WO | 2004010392 A2 | 1/2004 |

OTHER PUBLICATIONS

Machine Translation, dated Oct. 9, 2017, of Abstract for JP2000154661A.
Machine Translation, dated Oct. 9, 2017, of Abstract for FR2808914.
International Search Report and Written Opinion, dated Dec. 17, 2015, for corresponding PCT Application No. PCT/US2015/058592.

* cited by examiner

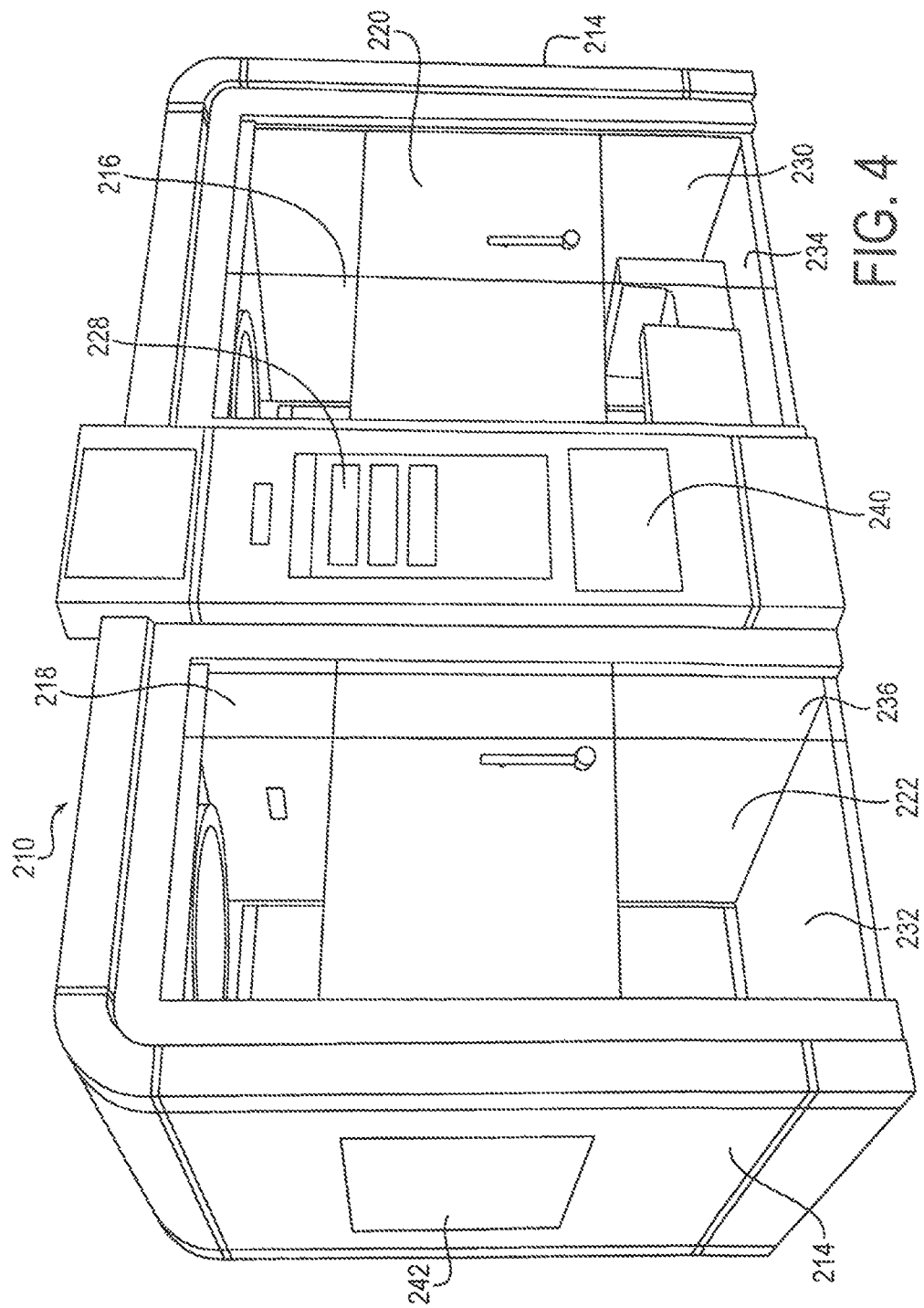

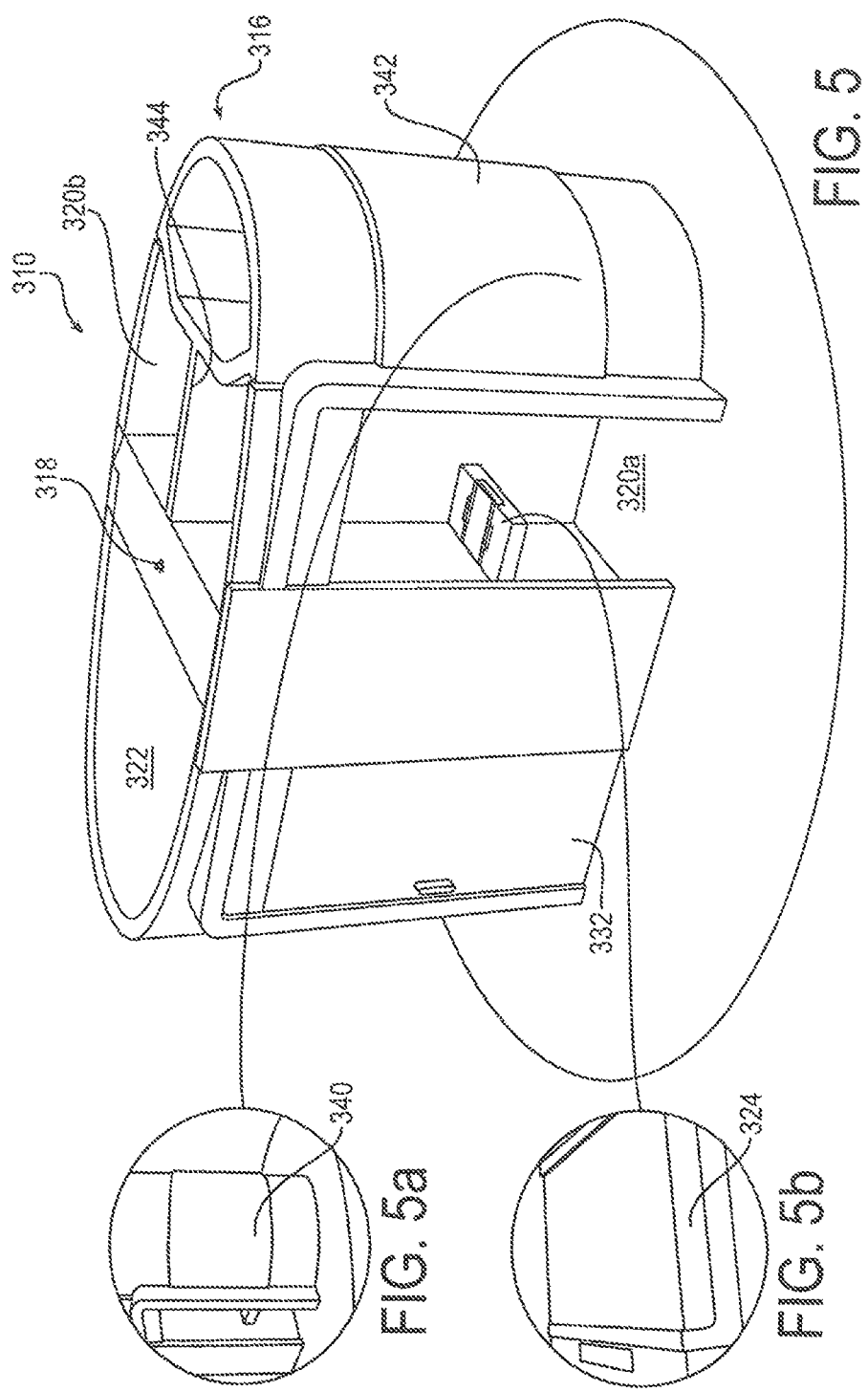

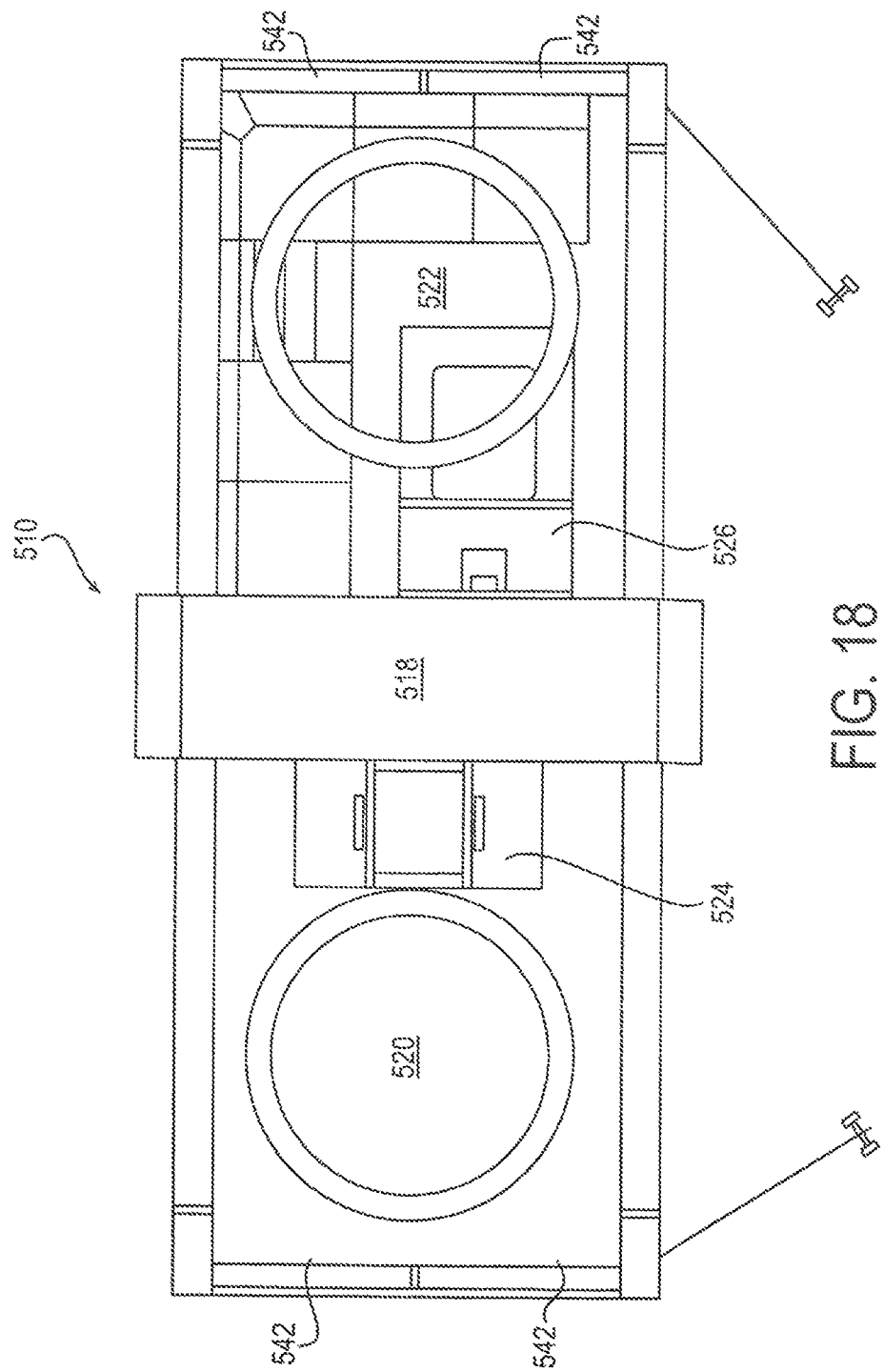

MODULAR CONSUMER FINANCIAL SERVICES AND TRANSACTION SYSTEMS

CROSS-REFERENCE TO RELATED APPLICATIONS

This application claims priority to and the benefit of all the following U.S. Provisional Patent Applications: No. 62/073,255 filed 31 Oct. 2014, No. 62/233,009 filed 25 Sep. 2015, No. 62/239,589 filed 9 Oct. 2015, and No. 62/246,038 filed 24 Oct. 2015, the contents of all of which are hereby incorporated by reference in their entirety

BACKGROUND

This relates in general to systems for providing financial services and transactions.

These systems are generally stand-alone machines. For one example, one such known system is the Automated Transaction Machine (ATM).

One category of ATM includes machines capable of conducting a wide variety of traditional banking transactions including acceptance of cash and/or checks for deposit, check cashing, and withdrawals/dispensing of cash, also referred to herein as currency or notes.

Currency/notes, checks and other sheet materials, generally referred to as documents, that are accepted and/or dispensed by an ATM, are typically housed in containers, such as bins or removeable cassettes, while the documents are stored in the machine. Typically, documents are dispensed from the cassettes and presented by the ATM through an aperture or opening in a user interface, typically in the front facing or top of a housing of the ATM. In some ATM, documents may be accepted through the user interface for deposit and the like and then placed into a cassette.

SUMMARY

This relates more specifically to a modular system for financial services and transactions.

In one embodiment, a modular system for financial services and transactions includes an enclosure with at least one wall defining an interior space. A spine is disposed within the interior space and houses at least one component. At least one sub-system is disposed in the interior space of the enclosure and connected to the at least one component housed in the spine, the at least one sub-system operable to interact with a financial customer.

The at least one sub-system may be an Automated Transaction Machine, or a consultation interface, or any other sub-system suitable for the interaction with a financial customer. The modular system may include a plurality of sub-systems, including an Automated Transaction Machine and a consultation interface.

A currency dispenser may be located within the internal space of the spine. The currency dispenser may have a customer interface on an exterior of modular system.

The at least one component in the spine may be a networking component in communication with the at least one sub-system, or a computer processing component in communication with the at least one sub-system.

The modular system may include a door for passage of a user. The door may be selectively secured by interaction of the user with the at least one sub-system. The wall may include a selectively transparent portion where the selectively transparent portion may selectively become opaque by interaction of a user with the at least one sub-system.

The modular system may include a customer queue accessible from the exterior of the modular system, where a user may be prioritized for entry into the interior of the modular system. The customer queue may be accessed by the user through wireless communication.

At least one partition may extend from the spine to at least partially dividing the interior space of the enclosure into multiple zones. The at least one partition may be generally planar and vertically oriented.

The modular system may further include a digital display separate from the sub-system mounted upon one of the at least one wall and the at least one partition. The digital display may be on an exterior of the at least one wall. The digital display may display information selected for a viewer based upon data correlated to a proximate viewer.

The modular system may include a security device adapted to send an alert based upon certain input. The input may be a user request.

The modular system may include an other sub-system in communication with the spine and having a user interface upon an exterior of the modular subsystem. The other sub-system may be adapted to interact with a user wirelessly.

Various aspects will become apparent to those skilled in the art from the following detailed description and the accompanying drawings.

BRIEF DESCRIPTION OF THE DRAWINGS

FIG. 4 is a perspective view of another embodiment of a modular system for financial services and transactions.

FIG. 5 is a perspective view of yet another embodiment of a modular system for financial services and transactions.

FIG. 18 is a top view of the modular system of FIG. 17.

DETAILED DESCRIPTION

Figure 1:
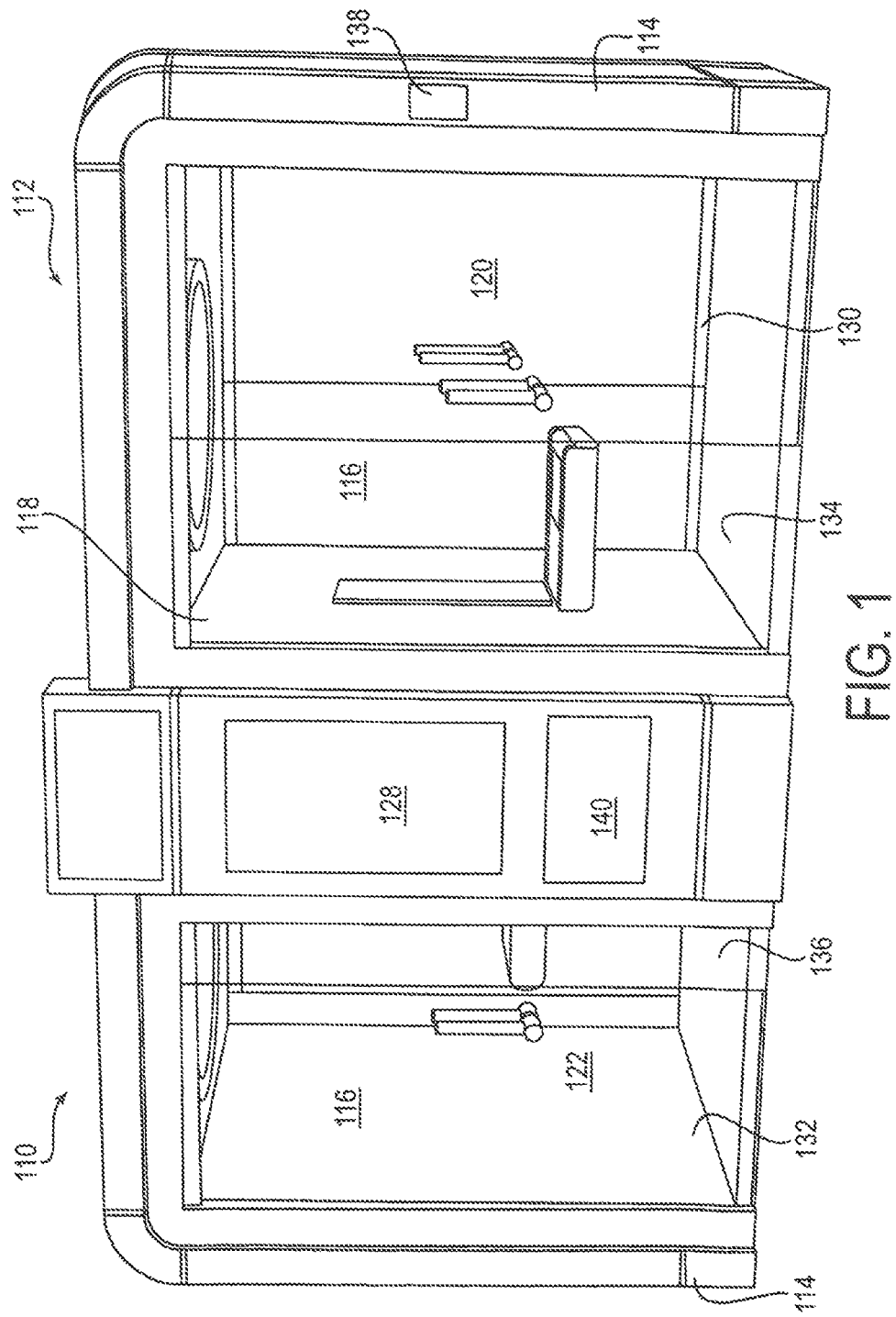
FIG. 1 is a perspective view of a modular system for financial services and transactions.

Referring now to the drawings, there is illustrated in FIG. 1 a modular system 110 for financial services and transactions. The modular system 110 includes an enclosure 112 with one or more walls 114 defining an interior space 116. A spine 118 is disposed within the interior space 116 and houses at least one component, such as a networking component or a computer processing component.

In this illustrated embodiment, the interior space 116 is divided into a transaction zone 120 and a consultation zone 122. At least one sub-system operable to interact with a financial customer is disposed in the interior space 116 of the enclosure 112 and connected to the at least one component housed in the spine 118.

Figure 2:
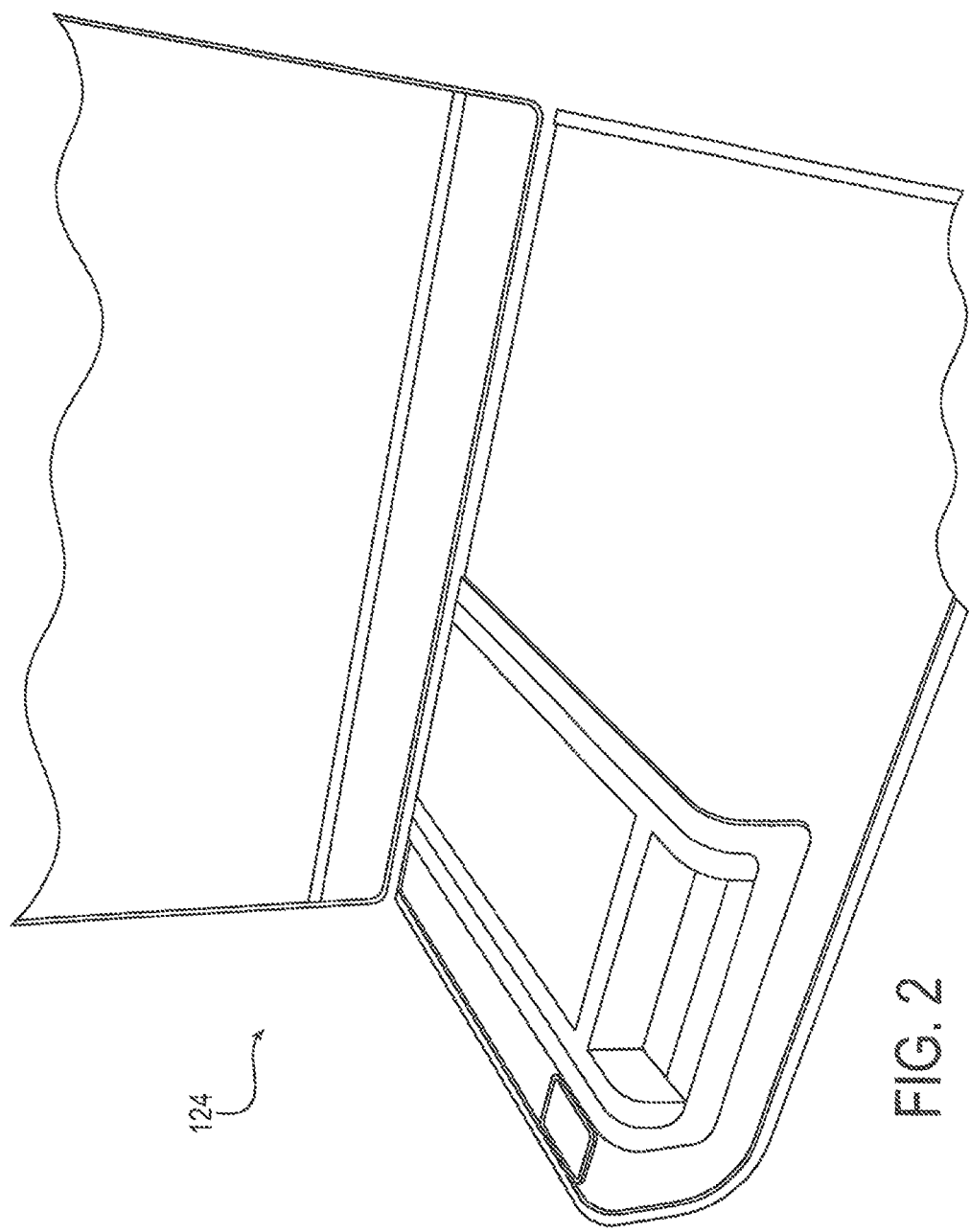
FIG. 2 is a partial perspective view of an Automated Transaction Machine (ATM) in the enclosure of the modular system of FIG. 1.
Figure 3:
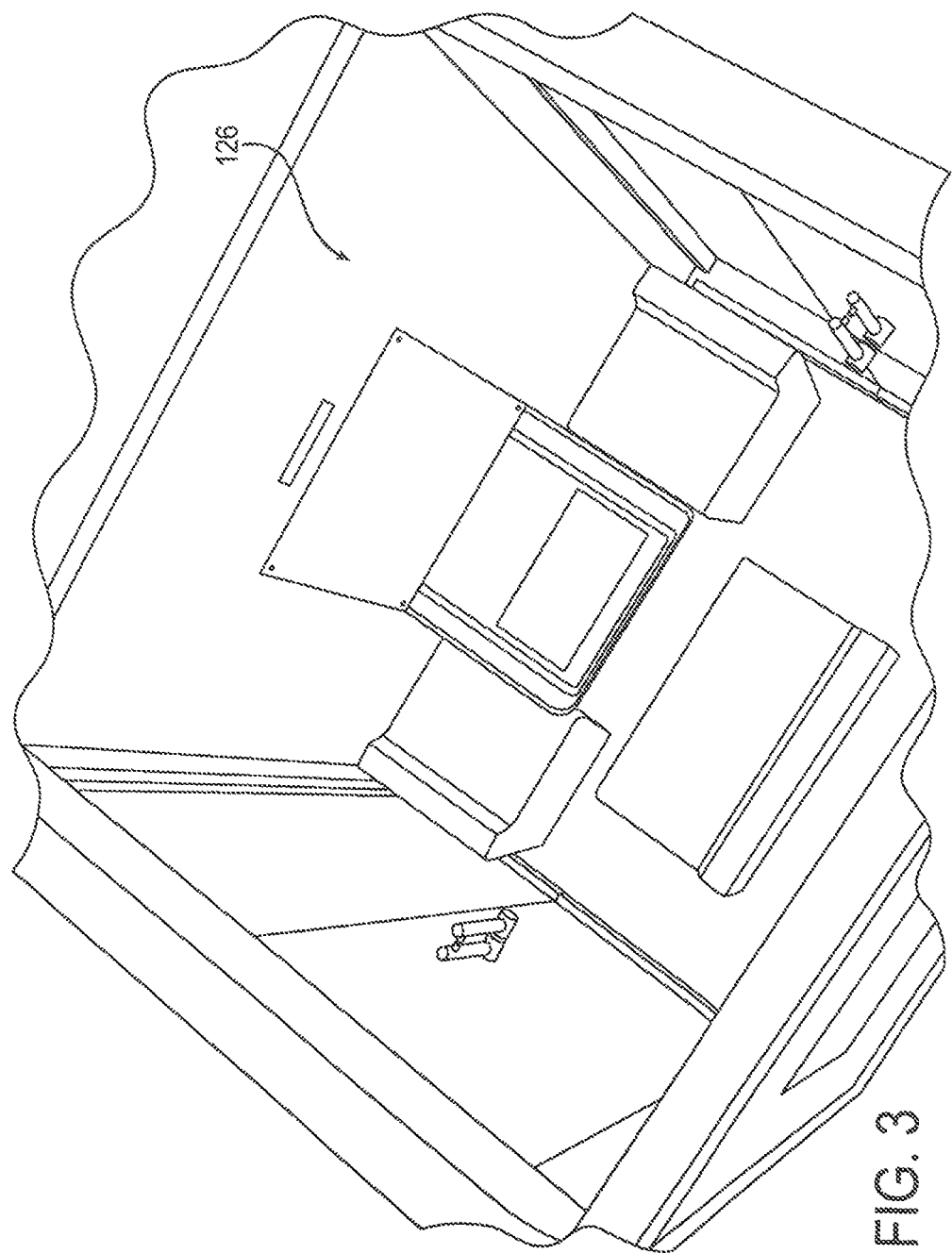
FIG. 3 is a partial perspective view of a consultation interface in the enclosure of the modular system of FIG. 1.
Figure 7:
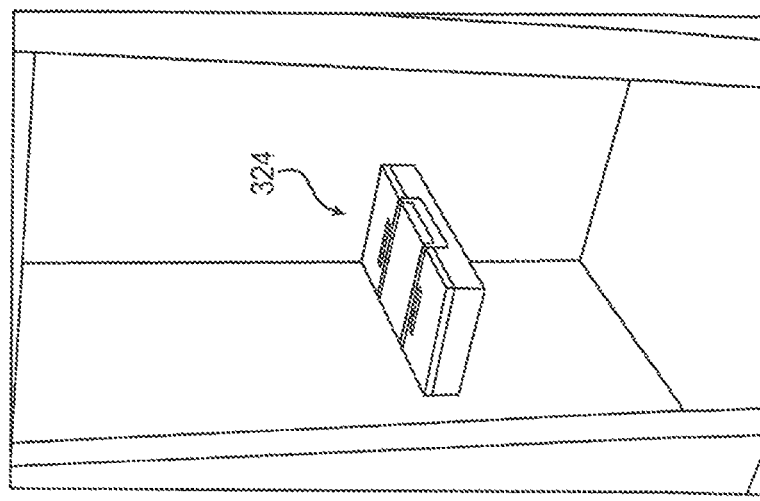
FIG. 7 is a partial perspective view of an Automated Transaction Machine (ATM) in the enclosure of the modular system of FIG. 5.
Figure 6:
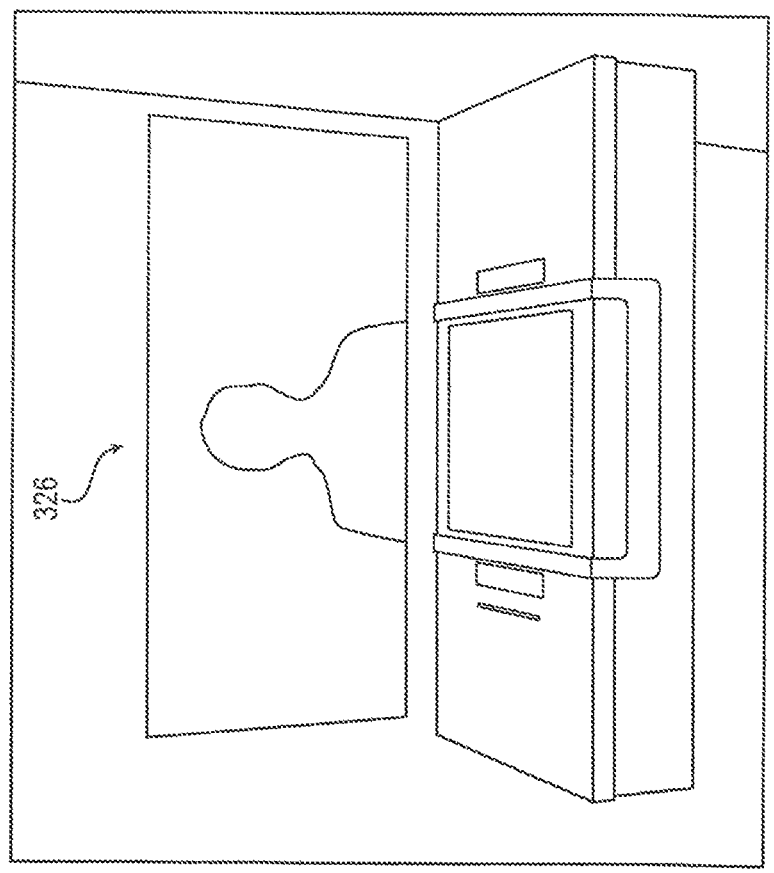
FIG. 6 is a partial perspective view of a consultation interface in the enclosure of the modular system of FIG. 5.
Figure 8:
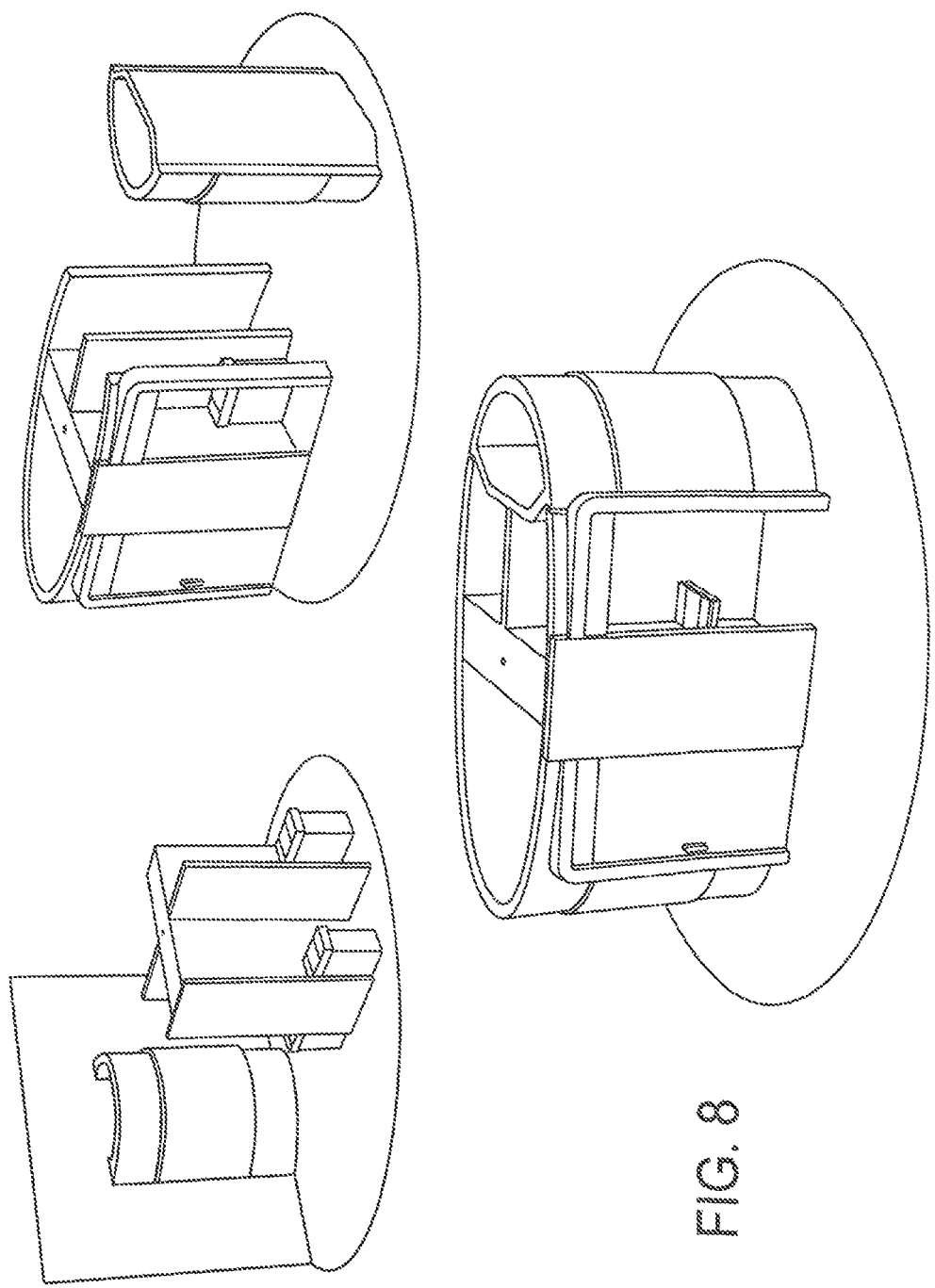
FIG. 8 is a perspective view showing multiple arrangements of the sections of the modular system of FIG. 5.
Figure 9:
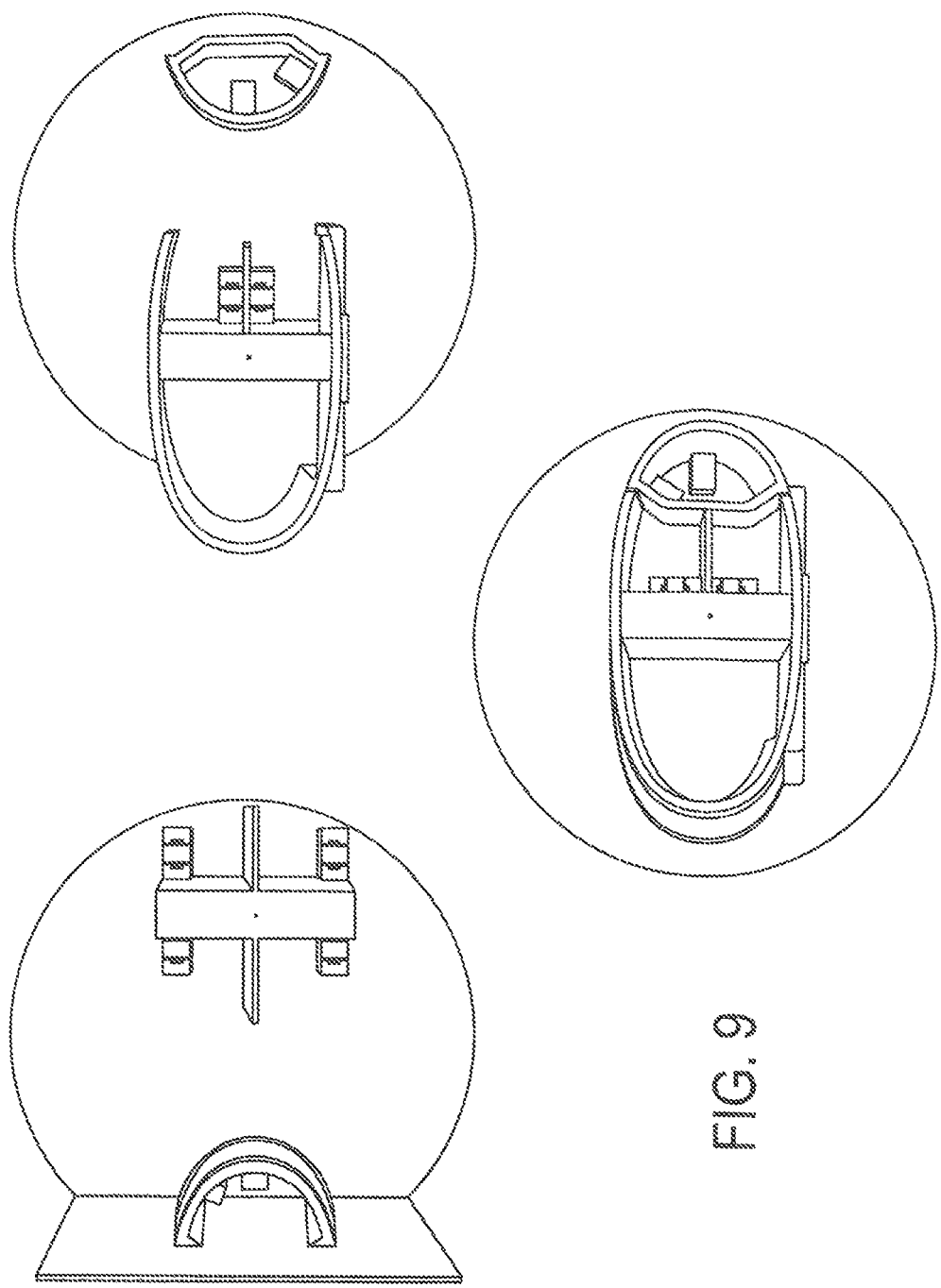
FIG. 9 is a top perspective view showing multiple arrangements of the sections of the modular system of FIG. 5.
Figure 10:
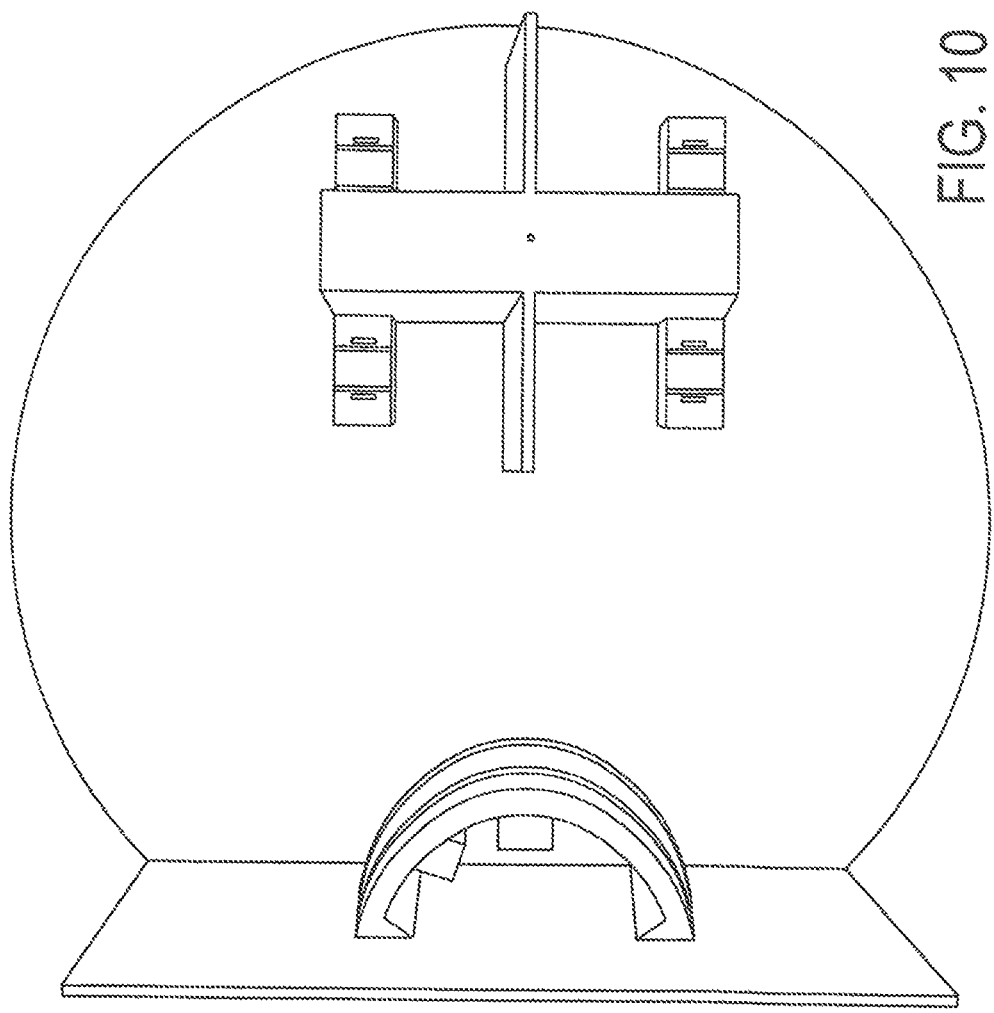
FIG. 10 is an enlarged top perspective view of the first configuration of FIGS. 8 and 9.
Figure 11:
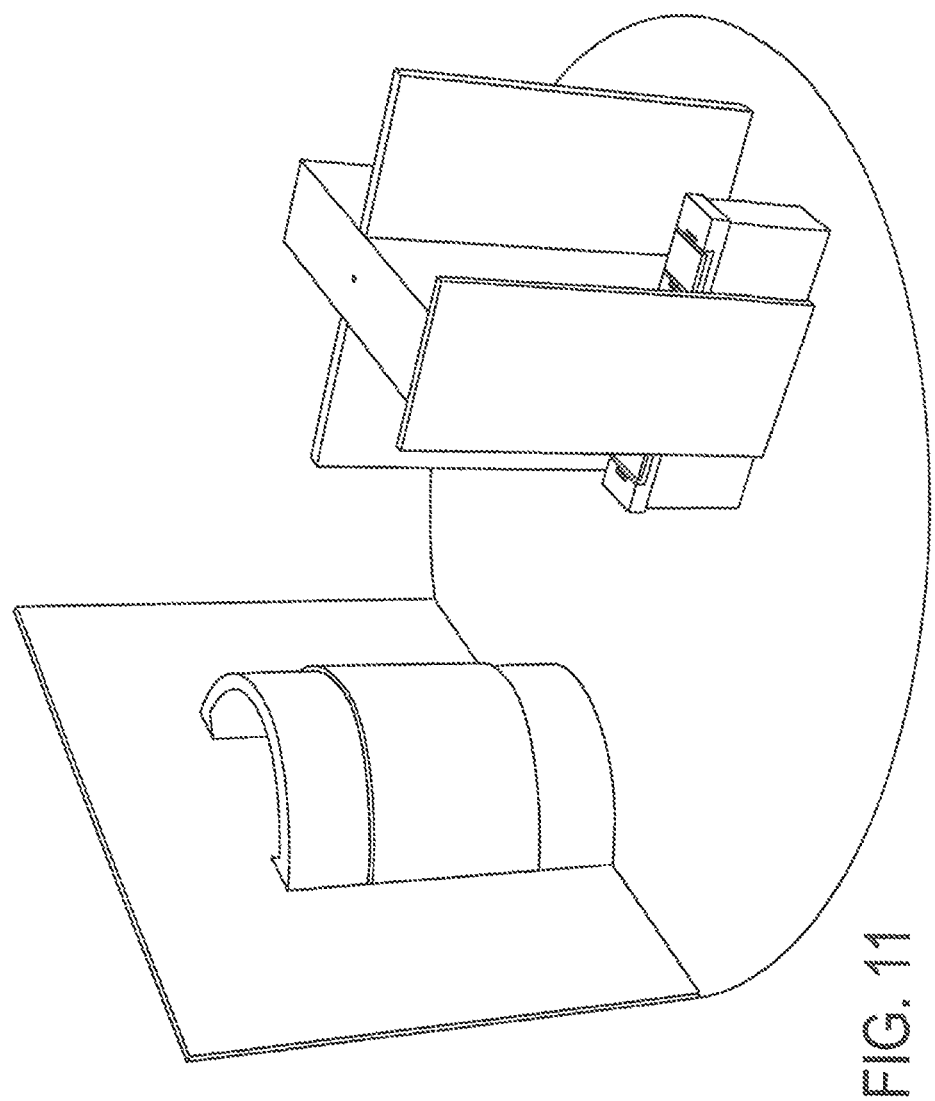
FIG. 11 is an angled perspective view of the first configuration of FIG. 10.
Figure 12:
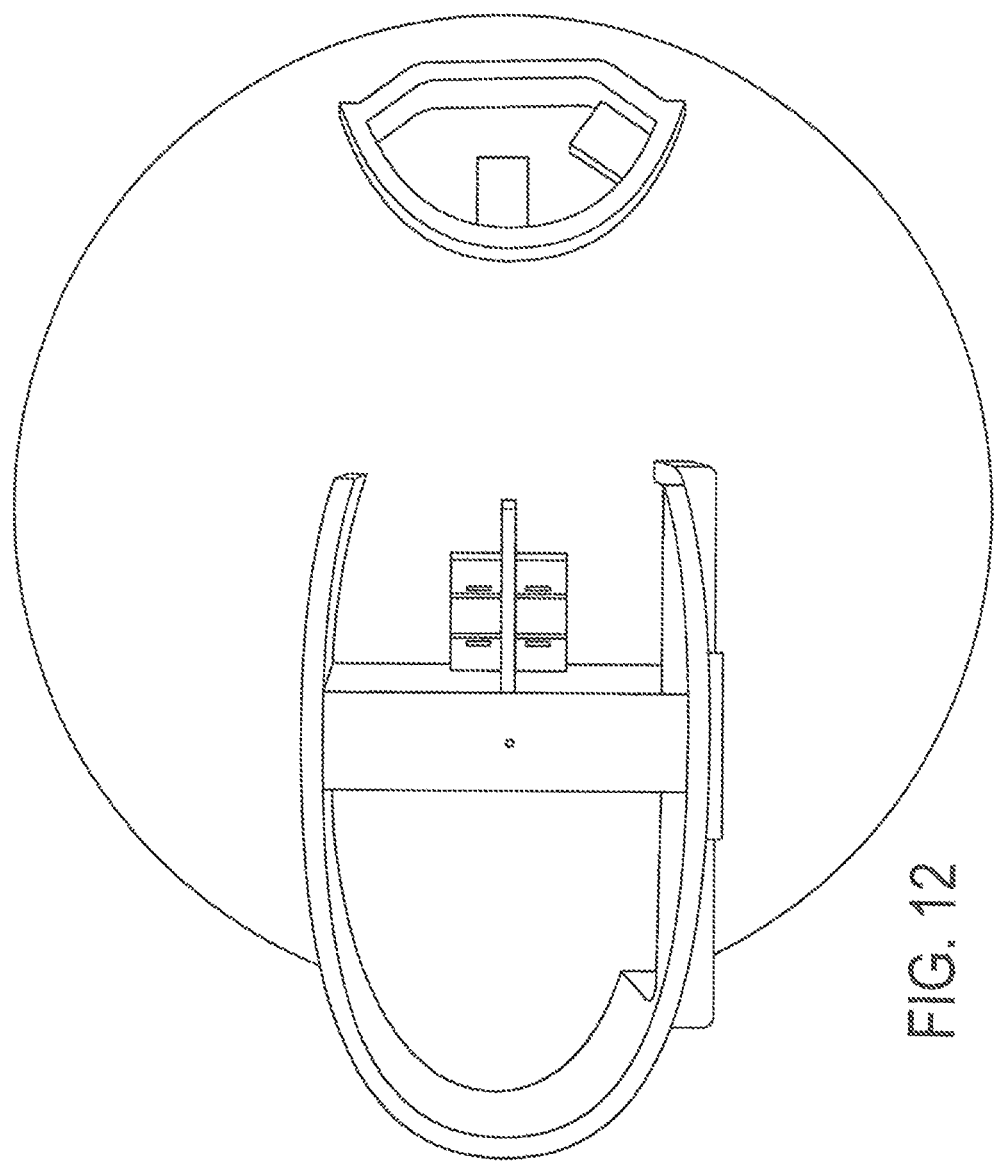
FIG. 12 is an enlarged top perspective view of the second configuration of FIGS. 8 and 9.
Figure 13:
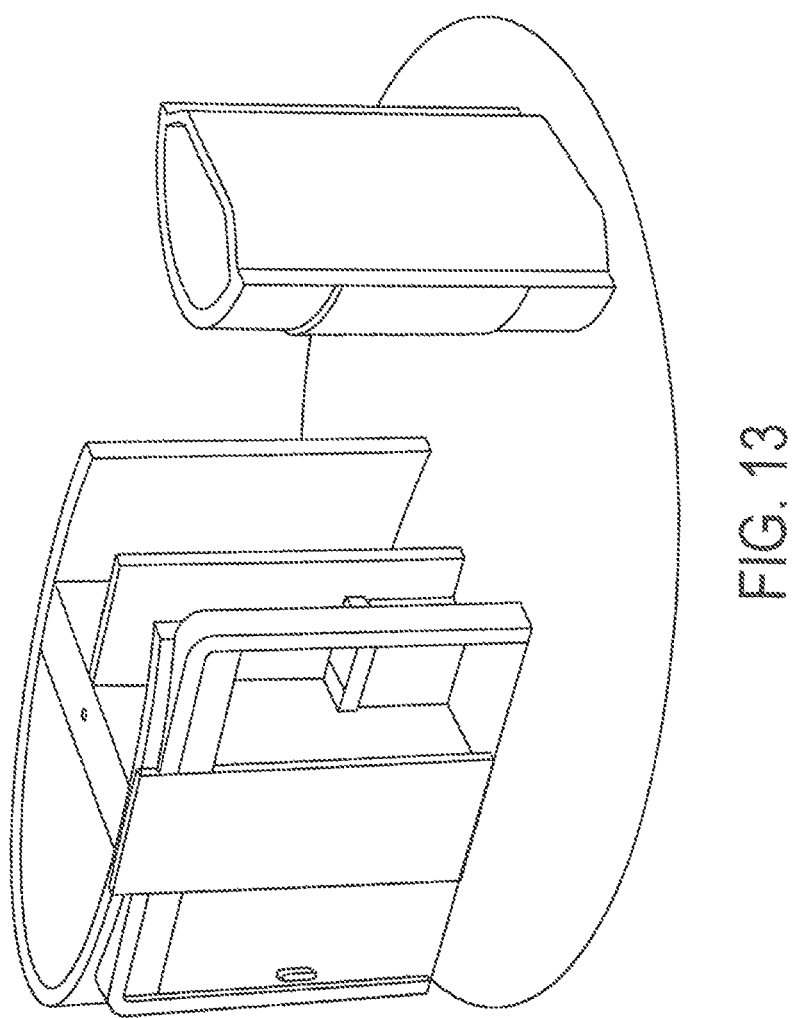
FIG. 13 is an angled perspective view of the second configuration of FIG. 12.
Figure 14:
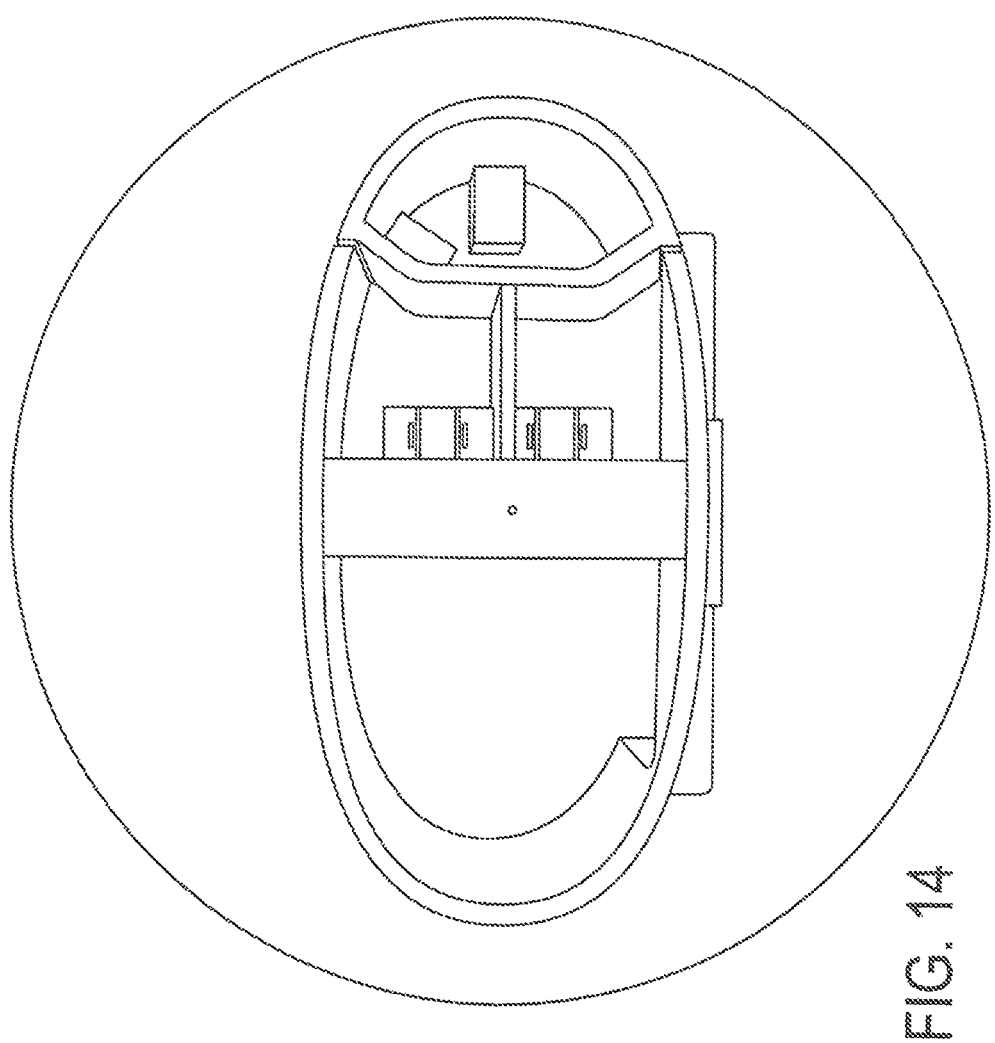
FIG. 14 is an enlarged top perspective view of the third configuration of FIGS. 8 and 9.
Figure 15:
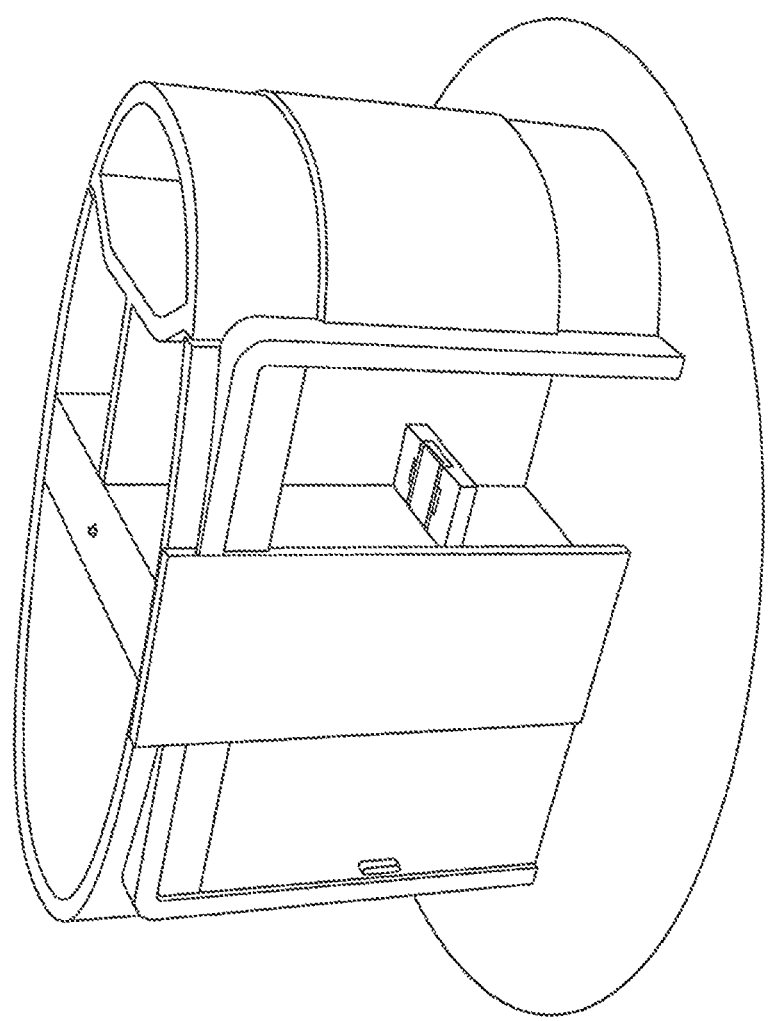
FIG. 15 is an angled perspective view of the second configuration of FIG. 14.

In this example, an Automated Transaction Machine (ATM) 124, as best shown in FIG. 2, is disposed in the transaction zone 120, and a consultation interface 126, as best shown in FIG. 3 and will be further described below, is disposed in the consolation zone 122. The modular system may, as desired, include any number or type of sub-system suitable for the interaction with a financial customer, and need not be limited to the arrangement shown.

In one example, a currency dispenser may be located within the internal space of the spine 118. The currency dispenser may have a customer interface 128 on an exterior of modular system 110.

The modular system 110 may include one or more doors 130,132 for passage of a user. One door 130 provides access to the transaction zone 120 and an other door 132 provides access to the consultation zone 122. The doors 130, 132 may be selectively secured by interaction of the user with the at least one sub-system. Thus, enabling security and privacy in the respective zone 120, 122. The modular system 110 may include at least one a selectively transparent portion 134, 136 per zone 120, 122. The selectively transparent portion 134, 136 may selectively become opaque by interaction of a user with the at least one sub-system to provide security and privacy for the user and/or to inform others that the zone is occupied or in use. In other embodiments, the doors 130, 130 may be the selectively transparent portions 134, 136. Alternatively, any sections or portions or the doors 130, 132 or other portions 134, 136 may be selectively transparent or opaque as desired. In at least one embodiment, such is achieved with electrically charged glass. In at least one other embodiment, such is achieved with a selectively transparent film placed over otherwise transparent material.

The modular system 110 may include a customer queue 138 accessible from the exterior of the modular system 110, where a user may be prioritized for entry into the interior of the modular system 100. The customer queue may be accessed by the user through wireless communication, such as by mobile phone, smart phone, or other mobile smart device. Alternatively, a user may directly interact with the customer queue 138, for example manually or by voice command.

The modular system 110 may include a security device, physical or virtual, adapted to send an alert based upon certain input. The input may be a user request. For example, the sub-system may have a panic button or other accessible emergency alert feature in case of an emergency.

The modular system may include an other sub-system in communication with the spine 118 and having a user interface 140 upon an exterior of the modular subsystem. The other sub-system may be adapted to interact with a user wirelessly, such as by Near Field Communication (NFC), Blue-tooth, inferred, or other wireless communication.

There is shown in FIG. 4 another embodiment of a modular system 210 for financial services and transactions. Similar components as to previous embodiments have been labeled with similar numbers.

The modular system 210 includes an optional digital display 242 separate from any other sub-system, and mounted upon one of the at least one wall 214 or at least one partition. The digital display 242 may be on an exterior of the at least one wall 214. The digital display 242 may display information selected for a viewer based upon data correlated to a proximate viewer. For example, a computer processing device of the modular system 210 may wirelessly interact with a mobile phone, smart phone or other smart device, to received data to guide the display, such as maps to branch locations, directed advertising, or other information such as weather or news alerts.

There is shown in FIG. 5 yet another embodiment of a modular system 310 for financial services and transactions. Similar components as to previous embodiments have been labeled with similar numbers.

The modular system 310 includes at least one partition that extends from the spine 318 and at least partially divides the interior space 316 of the enclosure into multiple zones, 320a, 320b. The at least one partition 344 may is shown as generally planar and vertically oriented.

As best shown in FIGS. 8-15, the modular system 310 may be arranged in a variety of orientations and configurations.

Figure 16:
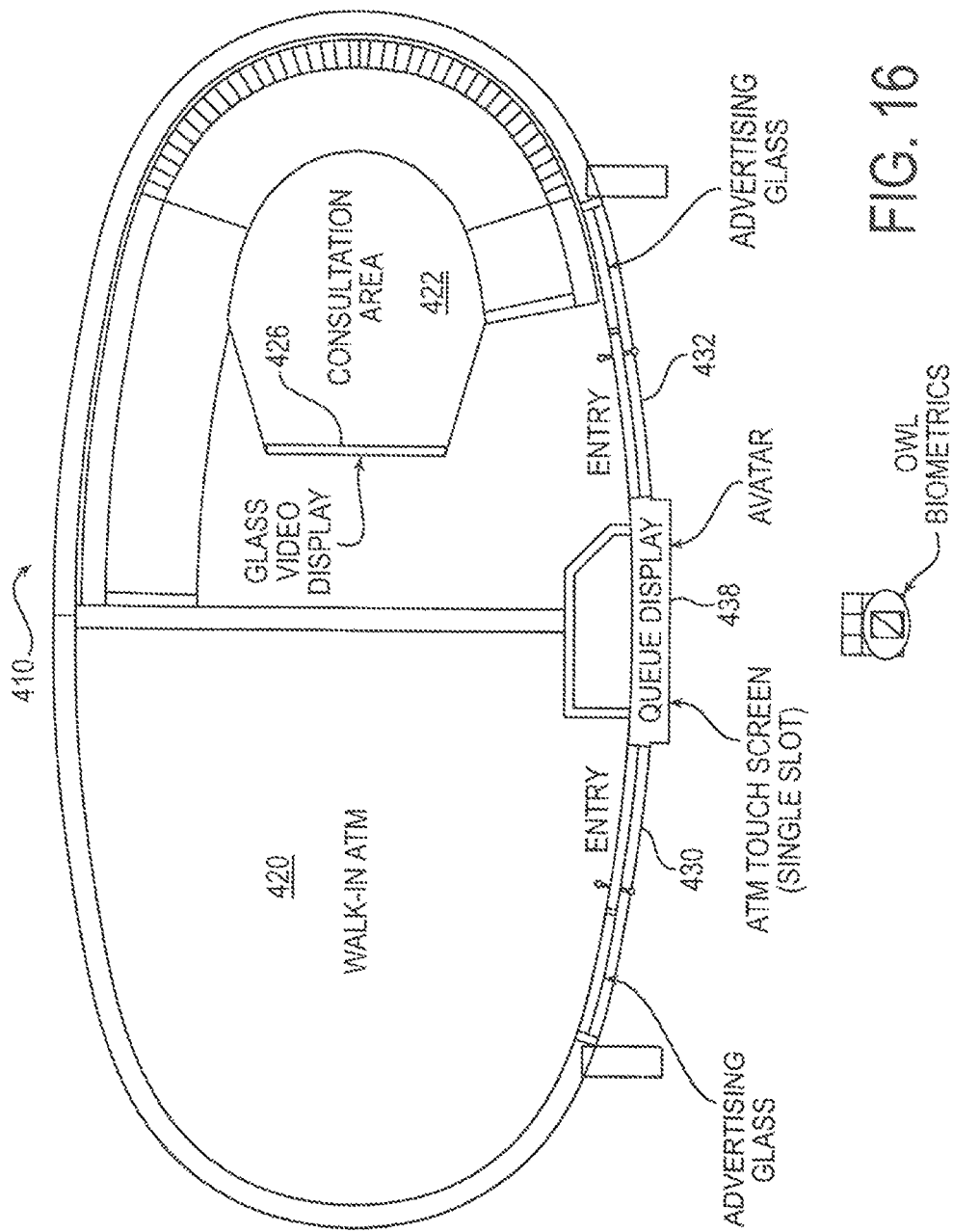
FIG. 16 is a schematic diagram of a further embodiment of a modular system for financial services and transactions.

There is shown in FIG. 16, by schematic diagram, a further embodiment of a modular system 410 for financial services and transactions. Similar components as to previous embodiments have been labeled with similar numbers.

Figure 17:
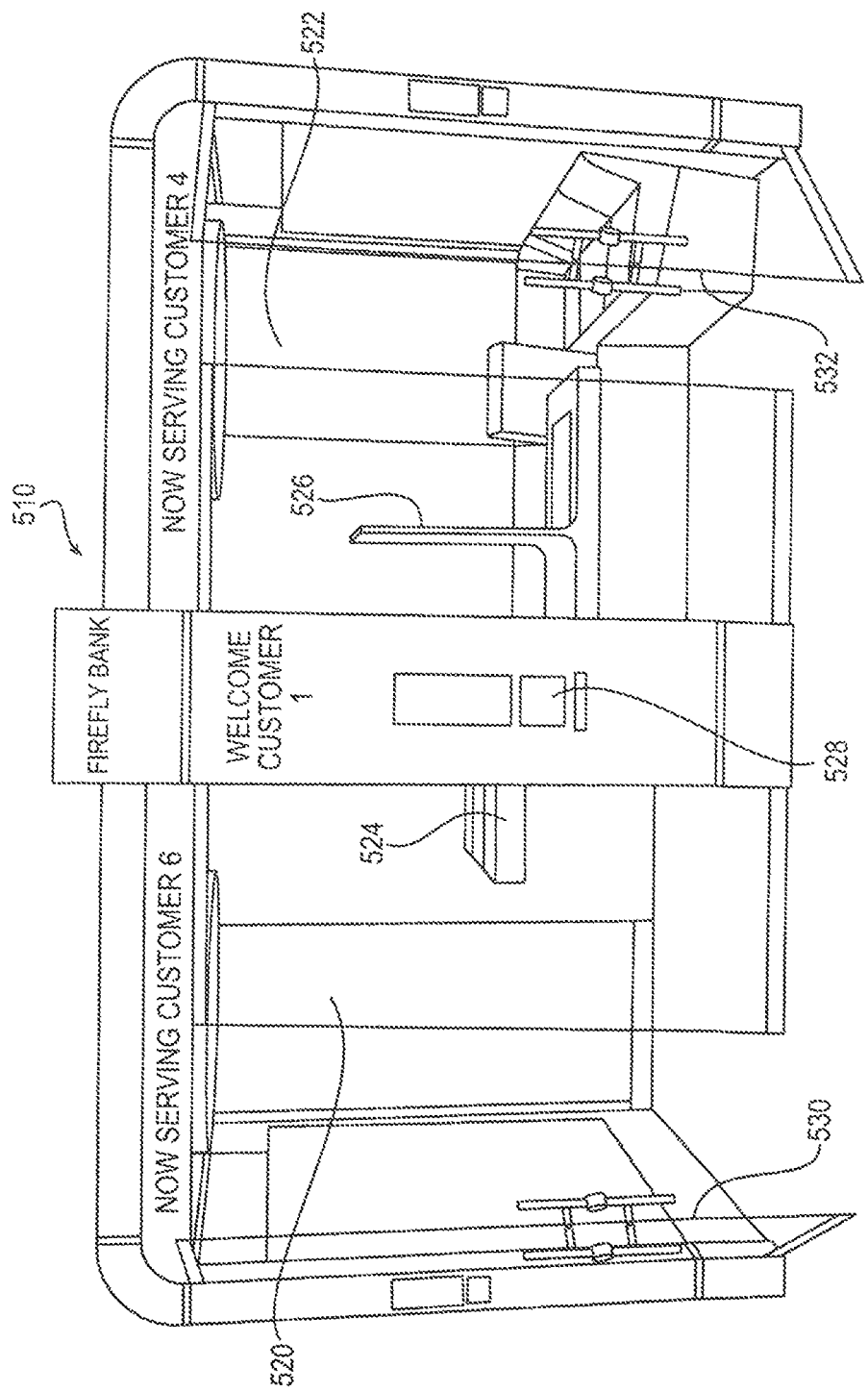
FIG. 17 is a front view of an additional embodiment of a modular system for financial services and transactions.

There is shown in FIGS. 17 and 18 an additional embodiment of a modular system 510 for financial services and transactions. Similar components as to previous embodiments have been labeled with similar numbers.

Modular systems (also referred to below as "Modules") may have multiple types and modes of consumer interaction and financial transaction facilities and devices for attracting consumers, conducting transactions and interacting with financial services personnel. In certain embodiments, the modular systems define and provide multiple experience zones in which different types of interactions between consumers and financial institutions can be initiated and carried out, such as transaction zones or consultation zones. These modular systems may further include customer attractions, such as a customer queue, information station, a fast transaction ATM, a complex transaction ATM, interactive consultation and any other suitable amenity.

The modular systems may include programmable exterior lighting and/or signage adaptable to any particular financial institution or institutions or other service providers. Once changes, these indicia may be static or may change, for example based upon the home financial institution of a user. Connectivity between the module and a user, for example via Wi-Fi or NFC, or via networks, including wireless networks, allows for consumer interaction with the module such as queueing or staging of transactions or consultation appointments. Bluetooth Low Energy (BLE) or iBeacons may be employed to communicate when a consumer or customer is in the proximity of the module. Exterior displays may be used to indicate the current status of various stations or components of the modular systems, such as automated transaction machine or automated teller machine (ATMs), and/or consultation availability. Additional, possibly smaller, displays may be used to message or greet individual consumers for queued transactions. These displays may be coordinated or synchronized with individual text messaging or e-mail and work through Wi-Fi and related wireless applications that perform transaction staging and pre-authorization.

Additionally, these lights, displays or screens generally on exterior surfaces of the modules, may include digital signage for branding and/or advertising in fixed frame or video, programmable accent and indicator lighting in any color or colors, static or changing, and touch-controlled interactive displays such as capacitive touch-controlled screens for consumer control of displayed content. This digital display "wall" or interactive digital display, similarly as disclosed for example in U.S. Pat. No. 8,144,271, may be provided to attract passers-by and encourage interaction with the wall for existing consumers or customers and new customers, to explore the products and services offered by a financial institution and the capabilities of the module, or any other information of interest or relevance.

In at least one particular embodiment, a relatively large display, such as for example 48 inches diagonal or larger, is touch-sensitive controlled for display of content relevant to a financial institution, information and transactions available at the module, advertising, news, weather or any other information in any suitable display format. This display may be programmed to present each of the functions, services, and products that are available at the module, and to receive and stage customer requests for different activities such as ATM access or consultation.

When a larger display located proximate to a smaller display, for example when one is used to identify the next customer in accordance with queuing, the other display can be used to present offer additional services to a customer while they wait. The identification process may have already been completed passively if the customer's mobile device is in proximity, or if facial/voice recognition or other biometric software is implemented. For queueing or pre-staging of transactions or appointments, for example if the customer would like to seek financial advice or complete a more complex transaction, they may reserve those spaces by scanning a QR code on the display wall. Reserving a place in line or making an appointment can be accomplished in at least the two following ways: 1) via a mobile application, a consumer logs in and enters the queue, and when that consumer arrives within the proximity of the iBeacons they are automatically placed into the queue in the next available slot; 2) via any number of touch screens, or other devices, affixed to the corner pillars of the module, or other suitable location, entering the queue from one of these touch screens or other devices. This may be automatic if it is thereby known that the consumer is in the proximity of the module. Once queued in with a mobile device, the customer may then be notified on their mobile device of availability of the requested service. Also, one of the displays may be programmed in any manner to display any combination or sequence of information and graphics in static or dynamic forms. In some embodiments, multiple screens may be arranged together to form a digital display wall or panel as a primary attraction feature of a module.

Financial transaction machines, such as automated transaction machines or automated teller machines (referred to herein individually and collectively as "ATM") may customer interfaces that are also accessible at the exterior of the module in certain exemplary embodiments. These ATMs may be, for example, primarily currency dispenser type ATMs, also referred to as "fast cash dispensers" or "Fast ATMs", with card or cardless or wireless consumer interfaces and communication for fast withdraw "quick cash" currency dispense transactions. A representative customer interface of a cash dispenser may include at least one display, for example programmed to identify the financial institution and available services, display of scannable codes, a card reader, preferably for magnetic stripe and smart cards—either electro-mechanical or electronic such as NFC-enabled—for acquiring account information from a customer card, a virtual PIN pad display or physical PIN pad, and a currency dispense outlet. In some embodiments, a separate display is used for display of a scannable code, such as a QR type code, for scanning by a customer with a wireless device that identifies the customer and related accounts for transaction authorization and currency dispense by the ATM. One or more biometric reading devices may also be incorporated into the customer interface, such as a fingerprint scanner located under the primary transaction display or next to the card reader. In recognizing the user and recalling their past transactions, the interface is able to prioritize the availability of frequent selections, allowing the transaction to be carried out faster. The customer receives "quick cash" and an e-receipt is sent to their banking profile, e-mail account or both. With the described hardware and software implementation, a typical fast cash withdraw transaction may be completed in as little as one to two minutes. The fast cash exterior ATM interfaces may be at multiple locations on the module exterior, for example at opposing sides of a central core or spine of the module as illustrated and as further described.

In the various embodiments and configurations, the modules include ATMs of various types, capabilities, and currency capacities. These ATMs can be incorporated into the modules at various locations and within enclosed areas of the modules. For example, in a partitioned or enclosed area of a module, accessible by one or more doors and having an interior wall and an exterior wall and an overhead structure, a customer interface of an ATM is integrated in an interior wall. The enclosed or semi-enclosed ATM is preferably of an advanced type capable of many more types of transactions in addition to dispensing currency. Typical capabilities of an advanced function or full-function ATM which may be employed in the modules include cash and check deposit in single or stack form or mixed stack, envelope deposit, check cashing, funds transfers between accounts, bill payment, voucher or coupon redemption, coupon dispense, check printing, passbook printing, coin deposit and coin dispense (loose or wrapped), product dispense and product purchases or browser-type functions with network connection to private or public networks, video and audio communication with a transaction facilitator by live remote or simulated such as Diebold Concierge Video Services™. The enclosed or partitioned area of the module provides privacy, security, and sound insulation for carrying out these types of advanced ATM transactions.

Another form of ATM which may be in an enclosed or partitioned area of the module has a relatively large vertical display which is primarily for display of a facial image of an financial institution representative such as a bank officer or teller, live or recorded or simulated such as a virtual avatar; and a relatively smaller display for example on a horizontal surface for display of information such as account and transaction details or documents. The ATM is also equipped with cameras for facial recognition and security, and microphones and speakers for two-way voice communication with the customer.

One representative transaction sequence at an advanced ATM transaction in the module includes the main stages of check-in, voice-automated workflow, and confirmation of the transaction. At the check-in stage, either a passive or an active form of identification quickly notices the customer and initiates a greeting, for example by video and accompanying audio of a virtual or live teller on the horizontal display. Either a passive of active form of identification quickly notices the customer and initiates a greeting. For the voice-automated workflow, the ATM recognizes speech commands and generates a workflow from recognized commands of the customer, which may be for example display of account balance, account activity, funds transfers between accounts, deposit, or withdrawals. For the confirmation stage, a task list and confirmation of all transactions completed can be displayed and sent to the customer e-mail or mobile device.

As noted, multiple cameras may be located within the complex transaction space, either in the ATM or in the surrounding walls of the module, for facial recognition, two-way video communication. A queueing display proximate to the entry to the enclosed ATM area can be programmed to identify and notify the next customer of availability of the ATM.

Further, the modular system may include a consultation interface. This may include additional or separate enclosed or partially enclosed area of the module architecture configured for consultation and further interaction with a financial institution. These consult areas or zones preferably include a display for live or virtual interaction, e.g. with a virtual avatar, and assistance with financial and banking matters, for example some of the type which are not presently conducted by a traditional ATM. Some representative interactions with a financial institution representative, teller or bank officer include generally inquiries about account status, activity or assessed fees such as overdraft fees, inquiries on available financial products and services, In at least one embodiment, a large vertically oriented display is positioned on an interior wall of the module for display of a live or virtual representative, which may be at an approximate life-size scale of the face and neck, or head and shoulders to approximate in-person interaction. Although, the display may be any size or in any orientation as desired. A second, optional, display may oriented horizontally, for example on a small table top surface, also referred to as a "smart table", for display of documents, account statements or other product or service information. Although, this display, if present, may be of any size or set in any orientation as desired. This tabletop display may also be used for document review and approval, such as loan documentation and endorsement thereof by digital signature, and configured for simultaneous display in module and at the financial institution. Cameras for facial recognition and security, and microphones and speakers for two-way voice communication with the customer are integrated into the consult area. Multiple cameras may be located within the consult space of the module for general security and facial recognition for security and identification. It may be further included that this area include devices to address the sound, such as sound dampening materials, sound canceling speakers, white noise generators or any other device to address noise and/or sound.

One representative interaction sequence, consultation, and/or transaction, in the consult area of the module includes the principle stages of check-in, connect, and confirm. At a check-in stage, either a passive or an active form of identification quickly notices and identifies the customer. An attendant, e.g. financial institution personnel or simulated virtual attendant, greets the customer and initiates the appropriate services for them or as requested. At a connect stage, unless the customer is solving a simple problem, the attendant will act as a liaison between the customer and a remote expert, using the smart table to access and edit documents related to the transaction with the customer. At the confirm stage, whether the last step in the session or transaction is cash withdrawal or simply confirmation of a transfer or deposit, a task list can be displayed on the smart table as confirmation in front of the customer that all transactions were performed, and the same information sent to the customer for their records.

These modules may be configured in conformance with any desired branding of any financial institution or other entity or organization, including exterior accent lighting, display background colors and graphics, display content and static or dynamic digital signage. Active branding allows for either user-specific or customer-specific customization. Interfaces and lighting can be transformed, for example by control software in the module, to embody and display the branding of any financial institution.

There are various structural designs and configurations of alternate embodiments of the module. In one general form, a module has a spine oriented generally transverse to a lengthwise extent of exterior walls. The spine may be generally rectangular and dimensioned to house a fast transaction currency dispenser ATMs, the full-function or advanced function ATMs in the complex transaction area, the large and small exterior displays, the consultation displays, one or more computers for controlling each of the various functions of the module as programmed, power connections and power supplies (including battery back-up power) for the currency dispensers and NFC readers and projectors for the consult display, network cable connections, security cameras, Wi-Fi antennas or other antennas and related electronic and mechanical equipment.

In one representative and preferred embodiment, the spine holds three Intel Next Unit Computing (NUC) PCs for running the fast-cash currency dispense application, virtual teller or Avatar, and the consult applications. The fast cash NUC may include a Trusted Platform Module (TPM), which allows running of Extensions for Financial Services (XFS), e.g. modified for Windows 8.1. The fast cash application may be an Access Point Services (APS) application that has both a master and a slave session. This enables running a transaction using the touch screen on the exterior of the module, and also in communicative connection with a consumer's mobile device, such as scanning a QR code on the touch screen display with a mobile device for identification and/or transaction initiation. The QR code references the URL of the slave APS session on the PC. The NUC that runs the virtual avatar also powers and controls the motion sensing device, such as Wii™ or Kinect™ type interactive technologies, as disclosed for example in U.S. Pat. No. 8,659,658, that watches for consumers entering and leaving the complex transact area. The PC communicates with an all-in-one tablet located in the complex transaction shelf or smart table over a service bus. The all-in-one tablet also includes a TPM and also runs standard XFS software, and an APS application for performing complex transactions. The NUC that controls the consult application also controls the motion detection that watches for consumer entering and leaving he consult area of the module.

Further, additional PCs may be used to power the various described interactive touch screens and programmed for interactive virtual navigation, which enable the user to change configuration and environment of the module, and scroll through and select marketing slides. Additional PCs may be located within the spine and may be used to control digital branding, including the LED light displays (for example, via an Arduino control board), motion graphics on the spine, and branding, etc.

In at least one embodiment, when in a generally transverse configuration, the spine divides the interior of the module between the complex transaction area and the consultation area. Access points to the interior space in the spine may be from the exterior of the module or from the interior of the module on either side of the spine. With each of the ATMs of the module physically connected to the spine, the service side of the ATMs may be accessed from the spine or by removal from the spine and for cash replenishment and collection of deposited items.

It should be understood, that any of the described and depicted modules may include separable sub-modules, which may be re-arranged in various configurations.

The disclosed modules and related concepts and features may provide for standalone banking platforms with multiple zones. The zones include user interactive devices, such as touch surfaces and/or sensing services, customer attractions, such as "smart" glass, video towers/walls with feature dynamic content management, user location/communication systems, such as near-field communications (NFC) systems, location-based proximity sensors (e.g. iBeacons™), and motion detection (e.g. Kinect™) to securely identify consumers, monitor traffic and personalize marketing content—all while gathering important information about consumer traffic and activity.

Modules may include queue management components. Such components may give consumers the ability to get in line for a session with a virtual teller, remote teller or to withdraw 'fast cash' all from their mobile device or the concept's exterior touch screen panels.

Modules may utilize cardless transactions. A unique quick response (QR) code or NFC may be used to authenticate a user and enable secure transactions—without the need for a card or PIN. From there, the user's mobile device may act as the main interface for private, secure transactions. Consumers can also initiate transactions via ApplePay™, for example.

Modules may employ an intelligent virtual teller(s) in the form of an interactive avatar that provides teller services for customers needing to conduct more complex transactions than a standard ATM may allow. This system may utilize natural language recognition, intelligent assistant software, directional audio and advanced cash-in/cash-out technologies.

Modules may employ the use of remote experts, for example, by the way of two way video. In at least one embodiment, Diebold's Concierge Video Services™ may be utilized. Users may have the option to connect live with a remote financial expert for personalized, face-to-face consulting services, the types of services that were previously confined to a main or branch banking location. In certain embodiments, applications of IP video, digital projection, privacy glass, multi-touch work surface and directional audio maintain privacy for customers, while intelligent systems facilitate a personalized experience by providing user insight on who the consumer is and where they are in their transaction.

Use of these modules may provide for greater access points, away from main and branch locations, yet allow for financial institutions provide these additional locations without the staffing necessary to run a main or branch location.

It should be noted that these modules may be particularly well suited for high-traffic areas such as malls or airports; or temporarily used in areas of temporary high demand, such as concerts, festivals, college registration/enrollment, and the like. Further, such modules may be used for smaller-scale use, such as in retail stores or pharmacies.

While principles and modes of operation have been explained and illustrated with regard to particular embodiments, it must be understood, however, that this may be practiced otherwise than as specifically explained and illustrated without departing from its spirit or scope.

What is claimed is:

1. A modular system for financial services and transactions comprising:
    an enclosure including at least one wall defining at least a first portion of a first interior space;
    a spine with at least one wall defining at least a second portion of the first interior space, wherein the spine defines an internal spine space, wherein the spine is adapted to at least partially define a second interior space, and wherein the internal spine space houses at least one component; and
    at least one sub-system disposed in the first interior space of the enclosure and connected to the at least one component housed in the internal spine space, the at least one sub-system operable to interact with a financial customer that is entirely within the first interior space or the second interior space.

2. The modular system of claim 1 where the at least one sub-system is an Automated Transaction Machine.

3. The modular system of claim 1 where the at least one sub-system is a consultation interface.

4. The modular system of claim 1 further comprising a plurality of sub-systems, where the plurality of sub-systems includes at least one Automated Transaction Machine and at least one consultation interface.

5. The modular system of claim 1 further comprising a currency dispenser located within the internal spine space, the currency dispenser having a customer interface on an exterior of the modular system.

6. The modular system of claim 1 where the at least one component in the spine is a networking component in communication with the at least one sub-system.

7. The modular system of claim 1 where the at least one component in the spine is a computer processing component in communication with the at least one sub-system.

8. The modular system of claim 1 further comprising a door for passage of a user, where the door may be selectively secured by interaction of the user with the at least one sub-system.

9. The modular system of claim 1 where the at least one wall of the first interior space includes a selectively transparent portion where the selectively transparent portion may selectively become opaque by interaction of a user with the at least one sub-system.

10. The modular system of claim 1 further comprising a customer queue accessible from the exterior of the modular system, where a user may be prioritized for entry into the interior of the modular system.

11. The modular system of claim 10 where the customer queue may be accessed by the user through wireless communication.

12. The modular system of claim 1 where at least one partition extends from the spine to at least partially dividing the first interior space of the enclosure into multiple zones.

13. The modular system of claim 12 where the at least one partition is generally planar and vertically oriented.

14. The modular system of claim 13 further comprising a digital display separate from the sub-system mounted upon one of the at least one walls of the first interior space and the at least one partition.

15. The modular system of claim 14 where the digital display is on an exterior of the at least one wall of the first interior space.

16. The modular system of claim 15 where the digital display is adapted to display information selected for a viewer based upon data correlated to a proximate viewer.

17. The modular system of claim 1 further comprising a security device adapted to send an alert based upon an input signal.

18. The modular system of claim 17 where the input signal is a user request.

19. The modular system of claim 1 further comprising an other sub-system in communication with the spine and having a user interface upon an exterior of the modular subsystem.

20. The modular system of claim 19 where the other sub-system is adapted to interact with a user wirelessly.

\* \* \* \* \*